UNITED STATES PATENT OFFICE.

ROBERT W. SCHWEIMLER AND PAUL A. POULALION, OF WHEELING, WEST VIRGINIA, ASSIGNORS TO COMPO-TILE FIREPROOFING COMPANY, OF WHEELING, WEST VIRGINIA, A CORPORATION OF WEST VIRGINIA.

TILE OR BLOCK.

1,255,236.      Specification of Letters Patent.      Patented Feb. 5, 1918.

No Drawing.      Application filed September 17, 1917. Serial No. 191,865.

*To all whom it may concern:*

Be it known that we, ROBERT W. SCHWEIMLER and PAUL A. POULALION, citizens of the United States, and residents of Wheeling, in the county of Ohio and State of West Virginia, have invented new and useful Improvements in Tiles or Blocks, of which the following is a specification.

Our invention is an improvement in tiles or blocks, and has for its object to provide a tile or block of the character specified especially adapted for use in floors, partitions, furring, conduits, flue linings, heat and vent ducts and sewer pipes.

In the present embodiment of the invention, the improved tile or block, which may be of any preferred size and shape, is composed of plaster of Paris, cement, slag and cinders, and the said ingredients are combined in varying proportions, depending upon the object in view.

The slag used is ordinary ground blast furnace slag, and the cinders are bituminous coal cinders. The slag is crushed sufficiently to permit its being readily mixed with the cinders, and the cinders are crushed to a diameter of about one-quarter inch, and the slag is used to fill in the voids between the cinders.

A preferred combination is as follows:

| | |
|---|---|
| Plaster of Paris | One part |
| Cement | Two parts |
| Slag | Two parts |
| Cinders | Four parts |

The improved composition is fireproof, waterproof, soundproof and may be penetrated by a nail, thus permitting laths, stringers and the like to be nailed to the composition. The composition, while strong, is very light.

The composition is formed in the following manner: The cinders are first reduced in a crusher to about one-fourth inch diameter. The cinders, cement and slag are then mixed in a small batch mixer, such as is ordinarily used for concrete. Water is now added until the mixture is sufficiently thin to pour, and plaster of Paris is added just before pouring. The plaster of Paris causes the mixture to set quickly so that the tile may be handled a few minutes after being poured. Preferably, the molds are made collapsible to permit the easy removal of the tile.

We claim:

1. A composition for tiles or blocks composed of cinders, slag, cement and plaster of Paris, in the following proportions: plaster of Paris, one part; cement, two parts; slag, two parts and cinders, four parts.

2. A composition for tiles or blocks composed of cinders, slag, cement and plaster of Paris.

3. A composition for tiles or blocks composed of cinders, slag, cement and plaster of Paris, formed by crushing the cinders, thoroughly mixing the cinders, cement and slag dry, adding water until the mixture is thin enough to pour, adding the plaster of Paris, and molding the mixture.

ROBERT W. SCHWEIMLER.
PAUL A. POULALION.

Copies of this patent may be obtained for five cents each, by addressing the "Commissioner of Patents, Washington, D. C."